United States Patent
O'Connor et al.

(10) Patent No.: US 12,080,002 B2
(45) Date of Patent: Sep. 3, 2024

(54) SYSTEMS AND METHODS FOR MEDICAL IMAGE REGISTRATION

(71) Applicant: NuVasive, Inc., San Diego, CA (US)

(72) Inventors: Sean O'Connor, San Diego, CA (US); Eric Finley, San Diego, CA (US); Kara Robinson, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 168 days.

(21) Appl. No.: 17/338,845

(22) Filed: Jun. 4, 2021

(65) Prior Publication Data

US 2021/0398299 A1 Dec. 23, 2021

Related U.S. Application Data

(60) Provisional application No. 63/040,410, filed on Jun. 17, 2020.

(51) Int. Cl.
*G06T 7/32* (2017.01)
*G06T 7/33* (2017.01)

(52) U.S. Cl.
CPC ............. *G06T 7/32* (2017.01); *G06T 7/33* (2017.01); *G06T 2200/24* (2013.01); *G06T 2207/10116* (2013.01); *G06T 2207/20104* (2013.01); *G06T 2207/30012* (2013.01)

(58) Field of Classification Search
CPC ....... G06T 2200/24; G06T 2207/10116; G06T 2207/20104; G06T 2207/30012; G06T 7/32; G06T 7/33
See application file for complete search history.

(56) References Cited

U.S. PATENT DOCUMENTS

| | | | |
|---|---|---|---|
| 6,102,861 A * | 8/2000 | Avila | G01S 7/52034 600/443 |
| 6,833,914 B1 * | 12/2004 | Bao | G01N 21/956 356/237.5 |
| 10,275,930 B2 * | 4/2019 | Visser | G06T 19/00 |
| 2007/0280556 A1 * | 12/2007 | Mullick | G06T 5/50 382/284 |
| 2010/0053159 A1 * | 3/2010 | Visser | G06T 19/00 345/440 |
| 2016/0117823 A1 | 4/2016 | Isaacs | |
| 2016/0321809 A1 * | 11/2016 | Chukka | G06V 20/695 |
| 2017/0154413 A1 * | 6/2017 | Yu | G06T 5/50 |
| 2017/0165008 A1 | 6/2017 | Finley | |
| 2017/0165501 A1 * | 6/2017 | Rapaka | G06T 7/73 |
| 2018/0074595 A1 | 3/2018 | Isaacs | |
| 2018/0150962 A1 * | 5/2018 | Fletcher | G06T 7/35 |
| 2019/0192229 A1 * | 6/2019 | Berlin | A61B 8/5246 |

FOREIGN PATENT DOCUMENTS

| | | | | |
|---|---|---|---|---|
| CN | 102132322 | * | 7/2011 | .......... G06T 3/0075 |
| WO | 2021061924 A1 | | 4/2021 | |

* cited by examiner

*Primary Examiner* — Zhiyu Lu

(57) ABSTRACT

Example systems and methods correctly align or register a first image with a second image using user input to identify location(s) of interest in the overlay image. The system can ask a user to select a vertebral level of interest on a screen displaying the baseline and/or the overlay image. Then, the user input can be advantageously to guide subsequent image registration steps. The systems and methods herein may also be used to augment an existing image-recognition algorithm.

19 Claims, 11 Drawing Sheets

SYSTEMS AND METHODS FOR MEDICAL IMAGE REGISTRATION

CROSS REFERENCE TO RELATED APPLICATION

This application claims priority to U.S. Provisional Application No. 63/040,410, filed Jun. 17, 2020, which is hereby incorporated herein by reference in its entirety for any and all purposes.

BACKGROUND

Medical imaging modalities such as computed tomography (CT), X-ray, or fluoroscopy generate ionizing radiation, which has been identified as a potential cause of medical problems.

SUMMARY

In one aspect, disclosed herein is method for image registration of medical images, the method comprising: receiving a baseline image of a subject containing one or more objects therewithin, the baseline image taken with a baseline image quality and a baseline radiation dosage; receiving an overlay image of the subject containing the one or more objects therewithin, the overlay image taken with an overlay image quality and an overlay radiation dosage, wherein the overlay image quality is optionally lower than the baseline image quality; receiving a user input comprising a location of interest of the subject of the overlay image, the baseline image, or both; registering the overlay image and baseline image of the subject based on the user input thereby generating a registered image; and optionally presenting the registered image on a digital display. In some embodiments, registering the overlay image and baseline image of the subject based on the user input comprises: a) applying a weight to pixel intensity of one or more pixels in the overlay image, the baseline image, or both based on the user input, thereby generating a weighted overlay image, a weighted baseline image, or both; b) aligning the baseline image or the weighted baseline image relative to the weighted overlay image using a transformation; d) calculating a score that correlates to the transformation; d) repeating b) and c) until a stopping criterion is met; e) selecting an optimal transformation based on the score thereof; and f) applying the optimal transformation to register the overlay image and the baseline image. In some embodiments, applying the weight to the pixel intensity of the one or more pixels in the overlay image, the baseline image, or both based on the user input comprises applying the weight to the pixel intensity of the one or more pixels in the baseline image or only in the baseline image. In some embodiments, applying the weight to the pixel intensity of the one or more pixels in the overlay image, the baseline image, or both based on the user input comprises damping the pixel intensity based on a distance from the one or more pixels to the location of interest. In some embodiments, the distance is below a user-defined threshold, no damping is applied. In some embodiments, the user-defined threshold is large enough to encompass at least a portion of the one or more objects. In some embodiments, applying the weight to the pixel intensity of the one or more pixels in the overlay image, the baseline image, or both based on the user input comprises using a preselected down-weighting function. In some embodiments, the preselected down-weighting function is a circularly-symmetric function with a peak of 1 at the location of interest that drops continuously away from the peak. In some embodiments, the preselected down-weighting function comprises a polynomial or sigmoid function that asymptotes to zero at a distance of infinity from the location of interest. In some embodiments, aligning the baseline image or the weighted baseline image relative to the weighted overlay image using the transformation comprises a two-dimensional rigid transformation, the two-dimensional rigid transformation comprising one or more of: scaling, rotation, and translation. In some embodiments, the score that correlates to the transformation is based on pixel intensity of pixels in an overlap area of the baseline image and the overlay image. In some embodiments, the one or more objects comprise anatomical features of the subject. In some embodiments, the one or more objects comprise one or more vertebrae of the subject. In some embodiments, the baseline image and the overlay image are of an identical view perspective of the subject. In some embodiments, both of the baseline image and the overlay image are of an anterior/posterior (AP) view or a lateral view of the subject. In some embodiments, the user input is entered via interaction at an input device. In some embodiments, the input device is a mouse or a touch screen. In some embodiments, the location of interest is in one or more objects. In some embodiments, the location of interest is within a vertebral body. In some embodiments, the location of interest includes at least one pixel. In some embodiments, the baseline image or the overlay image is two-dimensional. In some embodiments, the baseline image or the overlay image is an X-ray image. In some embodiments, the baseline image or the overlay image is acquired using a flat panel X-ray detector or an image intensifier detector. In some embodiments, the baseline image or the overlay image is acquired using a C-arm.

In another aspect, disclosed herein is a computer-implemented system comprising: a digital processing device comprising: at least one processor, an operating system configured to perform executable instructions, a memory, and a computer program including instructions executable by the digital processing device to create an application applying an image registration algorithm to medical images of a subject, the application comprising: a software module to receive a baseline image of a subject containing one or more objects therewithin, the baseline image taken with a baseline image quality and a baseline radiation dosage; a software module to receive an overlay image of the subject containing the one or more objects therewithin, the overlay image taken with an overlay image quality and an overlay radiation dosage, wherein the overlay image quality is optionally lower than the baseline image quality; a software module to receive a user input comprising a location of interest of the subject of the overlay image, the baseline image, or both; a software module to register the overlay image and baseline image of the subject based on the user input thereby generating a registered image; and a software module to optionally present the registered image on a digital display.

In yet another aspect, disclosed herein is non-transitory computer-readable storage media encoded with a computer program including instructions executable by a processor to create an application applying an image registration algorithm to medical images of a subject, the application comprising: a software module to receive a baseline image of a subject containing one or more objects therewithin, the baseline image taken with a baseline image quality and a baseline radiation dosage; a software module to receive an overlay image of the subject containing the one or more objects therewithin, the overlay image taken with an overlay image quality and an overlay radiation dosage, wherein the overlay image quality is optionally lower than the baseline image quality; a software module to receive a user input comprising a location of interest of the subject of the overlay image, the baseline image, or both; a software module to register the overlay image and baseline image of the subject based on the user input thereby generating a registered image; and a software module to optionally present the registered image on a digital display.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
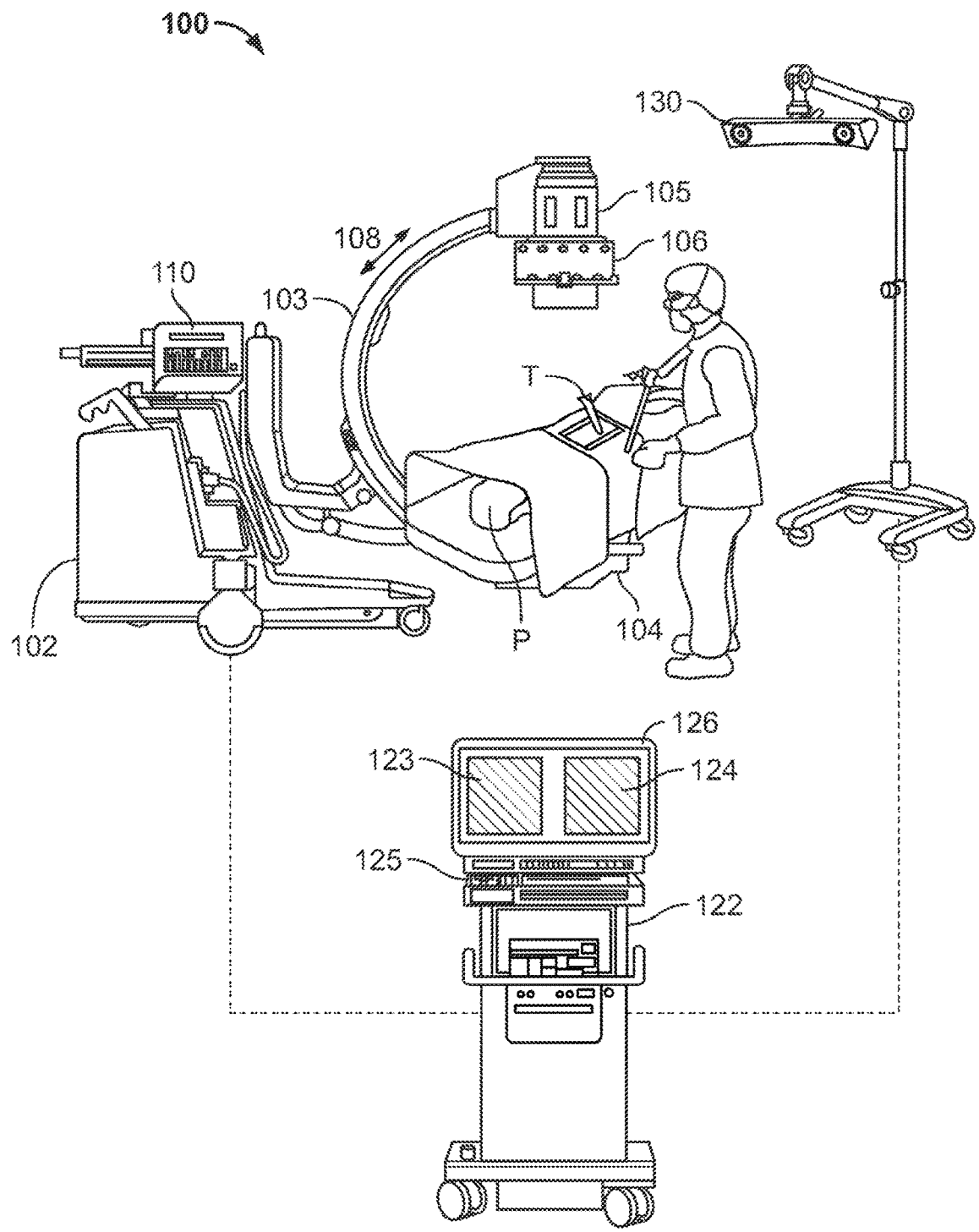
FIG. 1 illustrates an example imaging system with which one or more aspects described herein can be implemented.

Image enhancement techniques are developed to take low-quality, low-dose images and improve them to look more like conventional full-dose images. Such image enhancement techniques may offer the physician and hospital system the opportunity to use significantly reduced radiation with imaging in the operation room. The fundamental scheme may rely on a first, baseline image (e.g., a high quality and full dose image) aligned with an overlapping lower-quality low dose second, overlay image. The overlay image may contain different information than the baseline image. As an example, the overlay image may contain surgical tools or implants that only appear in the overlay image. Example techniques relating to high and low dose imaging are described in US 2018/0074595 (filed 2017 Sep. 22) and US 2017/0165008 (filed 2016 Dec. 14), which are hereby incorporated herein by reference in its entirety for any and all purposes.

Example existing image-enhancement techniques perform an image registration between the baseline and the overlay image based on matching anatomy in both images (e.g., vertebral anatomy). The image registration step can assume a rigid transform between the two images so that one image can only differ in translation, scale, and in-plane rotation compared to the other image. The image registration algorithm may use image content (e.g., pixel brightness or intensity) to calculate the best alignment transform. However, the traditional registration algorithms do not automatically recognize anatomy of interest (e.g., vertebrae) from irrelevant anatomy (e.g. ribs, soft tissue), and do not entirely remove interfering artificial objects (e.g. metal instruments). These non-relevant image features may contribute to the alignment transform search space (e.g., thereby increasing the amount of time needed to perform alignment), and may even improperly outscore the intended alignment (e.g., vertebrae to vertebrae). Thus, existing image registration algorithms may consume significant computing resources and result in incorrect registration and display of the baseline overlaid on the low-dose image, and thus a failure to properly enhance the vertebral anatomy of the low-dose overlay image. There is unmet and urgent need to selectively focus image registration on the anatomical features of interest rather than irrelevant anatomy in the images.

Disclosed herein are systems and methods relating to improvements in correctly aligning or registering a baseline image with a lower quality overlay image using a user's feedback. The systems and methods herein can advantageously use a faster path to discriminate relevant anatomy from irrelevant anatomy than using a machine learning algorithm alone. The systems and methods herein can rely on the visual image-interpretation skills of the user (e.g., an experienced surgeon or a radiologist). Recognizing complex objects such as vertebrae in low-dose low quality overlay images may be a challenging and time-consuming task for machine learning algorithms, but can instead be easy and fast for experienced users (e.g. surgeons). The systems and methods herein may introduce a step that requests the user to identify one or more locations of interest in the overlay image. For example, the user can be asked to touch the center or its close vicinity of the vertebral level of interest on a touch screen displaying the baseline and/or the overlay image. As another example, the locations of interest can include locations that the user believes to be useful for registering between one or more other images. Then, the user input can be advantageously used to guide subsequent image registration steps. The systems and methods herein may also be used to augment an existing image-recognition algorithm to more correctly and efficiently identify vertebrae or other anatomy.

For instance, the systems and methods herein selectively register at least a portion of one of an overlay image and a baseline image to the other one of the two. In some embodiments, a user input is utilized in the selective registration disclosed herein. In some embodiments, the user input includes identification of a location of interest in the overlay image, the corresponding baseline image, or both. In some embodiments, the user input is provided by a user that is experienced with reviewing or reading medical images acquired with the specific imaging modality (e.g., X-ray imaging). In some embodiments, the user input is provided by a surgeon or a radiologist. In some embodiments, the user input is provided via user interaction with an input device (e.g., a touch screen). The user input can include or may be converted by the systems, methods, and media disclosed herein to include one or more pixels or other divisions in the baseline and/or overlay image. In some embodiments, the user input may be within a vertebrae of the image displayed to the user. Alternatively, the user input may be outside of any vertebral body in the image.

Once the user input is received, the selected location in the image can be provided to an image-registration algorithm and serve as a focus for the image-registration algorithm. An example image-registration algorithm can then test many candidate alignment transforms (e.g., shift in left/right, shift in up/down, zoom in/out, rotate), computing a score for each transform that correlates with the similarity of image content between the two images after applying that transform (e.g., where a higher score indicates a better match or where a lower score indicates fewer differences). The transform with the highest overall score is chosen as the final estimated transform. The score can be a function of the intensity of the image content (e.g., calculated based on the grayscale value of the pixels) across all pixels in the overlap area of the two images. The influence of different areas of the image can be changed by modifying the weighting of particular regions based on the user input. For instance, the algorithm can be configured to down weight the pixel intensity proportional to the distance from the center of the spot the user touched, such that the intensity remains unchanged in a small region centered at the touch, then gradually drops to zero by the edge of the image. The down weighted image is then passed into the same alignment score search algorithm. This has the effect of dropping the score for transforms that align image features very far from the location selected by the user. Thus the transforms that correspond to irrelevant anatomy have a lower chance of winning the optimization.

The shape of the down weighting function can be optimized for improved alignment performance. One approach is to apply a circularly-symmetric function with a peak of 1 (e.g., full weight) at the user-selected location and dropping gradually away from the peak (e.g., toward 0, which can correspond to no weighting). The shape of the drop can be set to a smooth continuous function, such as a polynomial or sigmoid shape, that asymptotes to zero at a distance of infinity from the touched location. The function can remain close to 1 for a small area near the touched function, with a characteristic size large enough to contain anatomy of interest. For example, the radius can be chosen to the typical size of one vertebral level in typical C-Arm images. The weighting can be applied to either baseline or low-dose image, or both images. For easier usability an example implementation can be configured to apply only to the baseline image, as there will typically be several dozen low-dose images per baseline.

An example system with which techniques described herein can be used is shown and described in FIG. 1, below.

Example System

FIG. 1 illustrates an example imaging system 100 with which one or more aspects described herein can be implemented. The imaging system 100 includes a base unit 102 supporting an imaging device 103. The illustrated imaging device 103 is a C-Arm imaging device that includes a radiation source 104 positioned beneath the patient P and configured to direct a radiation beam upward to the receiver 105. It is known that the radiation beam emanated from the source 104 is conical so that the field of exposure may be varied by moving the source closer to or away from the patient. The source 104 may include a collimator that is configured to restrict the field of exposure. The imaging device 103 can be rotated about the patient P in the direction of the arrow 108 for different viewing angles of the surgical site. In some instances, implants or instruments T may be situated at the surgical site, necessitating a change in viewing angle for an unobstructed view of the site. Thus, the position of the receiver 105 relative to the patient, and more particularly relative to the surgical site of interest, may change during a procedure as needed by the surgeon or radiologist. Consequently, the receiver 105 may include a tracking target 106 mounted thereto that allows tracking of the position of the imaging device 103 using a tracking device 130. By way of example, the tracking target 106 can include a plurality of infrared reflectors or emitters spaced around the target, while the tracking device is configured to triangulate the position of the receiver 105 from the infrared signals reflected or emitted by the tracking target. The base unit 102 can include a control panel 110 through which a radiology technician can control the location of the imaging device 103, as well as the radiation exposure. A typical control panel 110 thus permits the radiology technician to "shoot a picture" of the surgical site at the surgeon's direction, control the radiation dose, and initiate a radiation pulse image.

The receiver 105 of the imaging device 103 transmits image data to an image processing device 122. The image processing device 122 can include a memory associated therewith and a processor for executing software instructions. The image processing device 122 can also incorporate a frame grabber that uses frame grabber technology to create a digital image for presentation at one or more displays 123, 124 of a display device 126. The display device 126 is positioned for interactive viewing by the surgeon during the procedure. The displays 123, 124 can be used to show images from two views, such as lateral and A/P, or may show a baseline scan and a current scan of the surgical site, or a current scan and a "merged" scan based on a prior baseline scan and a low radiation current scan, as described herein. An input device 125, such as a keyboard, mouse, touch screen, or gesture control device can allow the surgeon to select and manipulate the on-screen images. It is understood that the input device 125 may incorporate an array of keys or touch screen icons corresponding to the various tasks and features implemented by the image processing device 122. The image processing device 122 includes one or more processors that can convert the image data obtained from the receiver 105 into an electronic format. In some cases, the imaging device 103 can operate in cinematic exposure mode and generate many images each second. In these cases, multiple images can be averaged together over a short time period into a single image to reduce motion artifacts and noise. The image processing device 122 can take any of a variety of different forms. In some instances, the image processing device 122 is configured as a multi-user cart (e.g., referred to as a "technology cart", "surgical cart", or "system cart") for use in an operating room that provides multiple different surgical applications (e.g., navigation, surgical planning, imaging, and rod bending, robot control) from the cart. A non-limiting example of such a cart can be provided as part of the PULSE platform by NUVASIVE, INC.

The image processing device 122 can be configured to provide high quality real-time images on the displays 123, 124 that are derived from lower detail images obtained using lower doses (LD) of radiation. The image processing device 122 can further provide full dose images. While they can be described as "full dose", the full dose images need not be the fullest possible dose of radiation. Rather, "full dose" can correspond to a dose of radiation believed to result in a reasonably high level of detail. Examples of such full and low dose images are shown in FIGS. 2A and 2B.

Figure 2B:
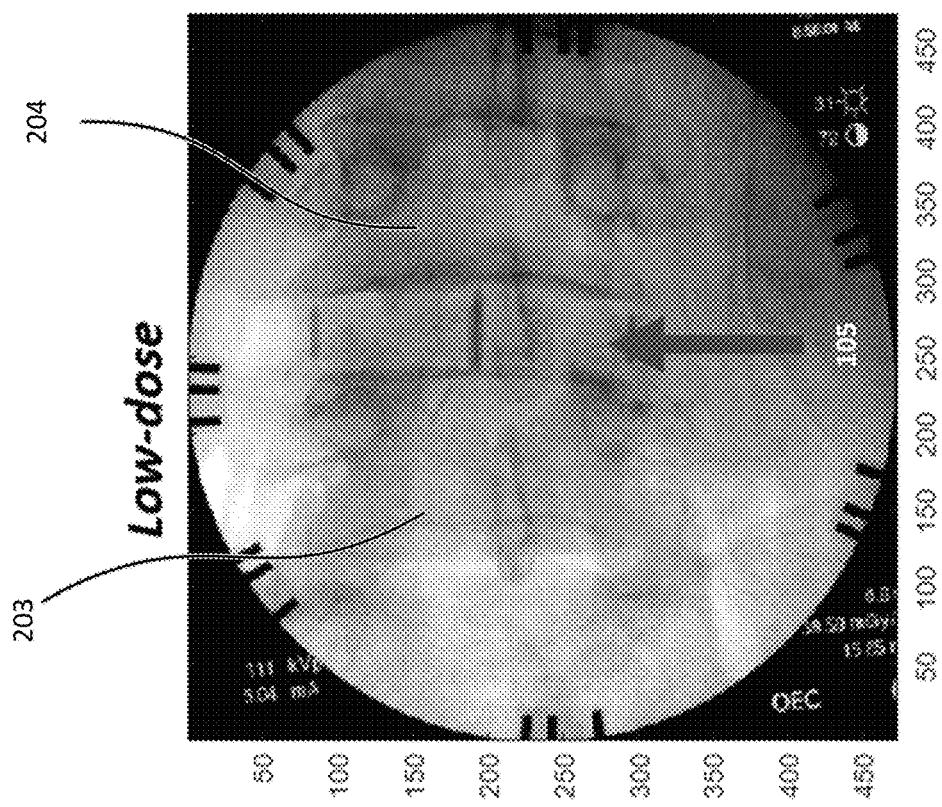
FIGS. 2A and 2B show an example embodiment of the systems and methods for registration of medical images, with a baseline image (FIG. 2A) and an overlay image (FIG. 2B) showing the anterior-posterior view of the same subject but with moved anatomy due to implant insertion.
Figure 2A:
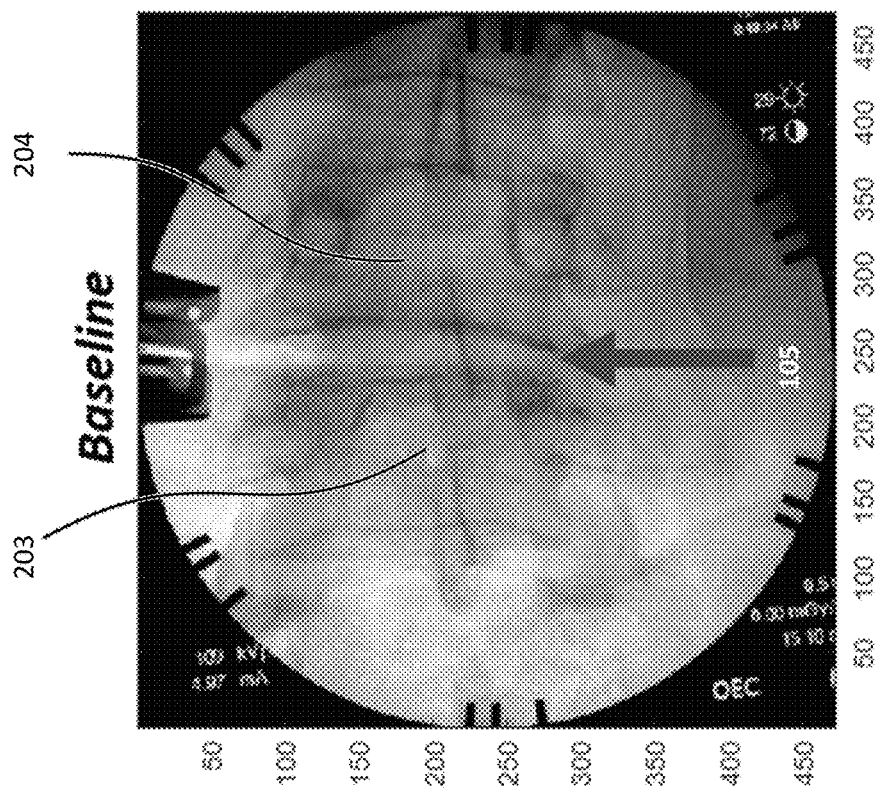

FIG. 2A is a full dose pre-operative C-Arm image, while FIG. 2B is a low dose and/or pulsed intraoperative image of the same spinal anatomy, including a first vertebra 203, a second vertebra 204, and an intervertebral space 205. Further, FIG. 2B illustrates an implant in the intervertebral space 205 that expands the intervertebral space 205, while FIG. 2A does not. It is apparent that the low-dose image is noisy and provides less information about the local anatomy for accurate image guided surgery. While the full-dose image provides a crisp view of the surgical site, the higher radiation dose makes taking multiple full-dose images during a procedure undesirable.

The systems, methods, and media disclosed herein may select to register a portion of the overlay image and/or the baseline image that encompass the feature(s) of interest (e.g., anatomical features, surgical implants, etc.). Such selection can be derived from the user's input. For example, the portion left to intervertebral space 205 (e.g., as indicated by the arrow) the arrow or the portion right of the intervertebral space 205.

Figure 3:
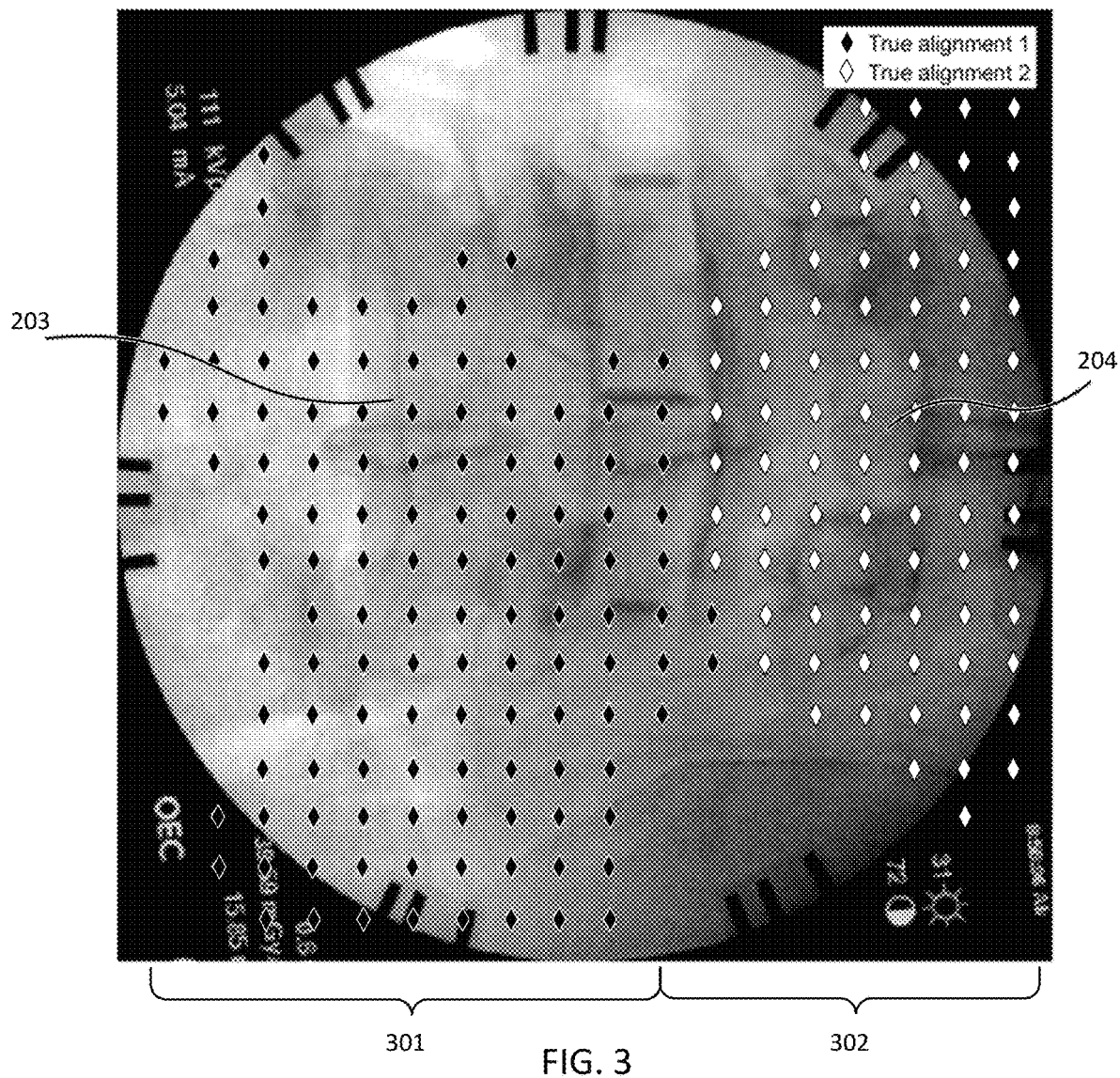
FIG. 3 shows an example overlay image superimposed with possible user inputs for registering different vertebral bodies with the baseline image.

FIG. 3 illustrates the image of FIG. 2B with example selection dots 301, 302 overlaid. In an example, a user selects any one or more pixels or other image subdivisions in the left dotted region 301 as the user input, as shown in FIG. 2B, to register vertebra 203. As another example, a user can select any one or more pixels or other image subdivisions in the right dotted region 202 as the user input in order to register another vertebra 204. The user input can include one or more pixels or other subdivisions only from the vertebra body, the disc, the anatomical features other than the spine, or the non-anatomical background. The user input can include one or more pixels or other subdivisions from one or more of: the vertebra body, the disc, the anatomical features other than the spine, and the non-anatomical background. The non-limiting exemplary user-inputs 301, 302 that may yield optimal image registration for the vertebra in the left portion 203 of the image or for the vertebra in the right portion 204 of the image. As can be seen in FIG. 3, user input can be in the vertebral body or near the vertebral body. User input may also be at the one or more objects (e.g., vertebral bodies), at the irrelevant anatomy, or even in the background that is free of anatomical features.

In some examples, the selection dots 301, 302 are not readily visible to a user. In other examples, the selection dots 301, 302 are visible to a user. In some examples, the selection dots 301, 302 are disposed in predetermined locations (e.g., according to a grid) that do not vary based on the content of the images. In other examples, the selection dots 301, 302 can be disposed in one or more locations selected by an algorithm configured to identify salient locations. For example, one or more saliency detection algorithms provided by OPENCV can be used. In some examples, responsive to the selection of one or more of the selection dots 301, 302 by the user, a preview of the effect of the selection can be provided. For example, an overlay can be provided over the image showing a shape of the resulting weighting that will be applied based on the user's selection.

Figure 4B:
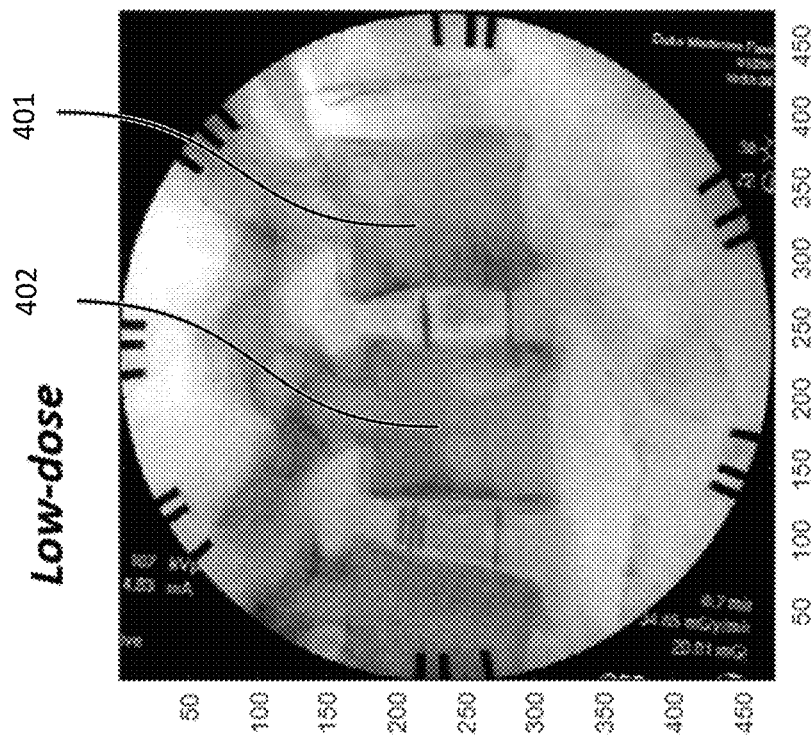
FIGS. 4A and 4B show an exemplary embodiment of the systems and methods for registration of medical images, with a baseline image (FIG. 4A) and an overlay image (FIG. 4B) showing the lateral view of the same subject but with moved anatomy due to implant insertion.
Figure 4A:
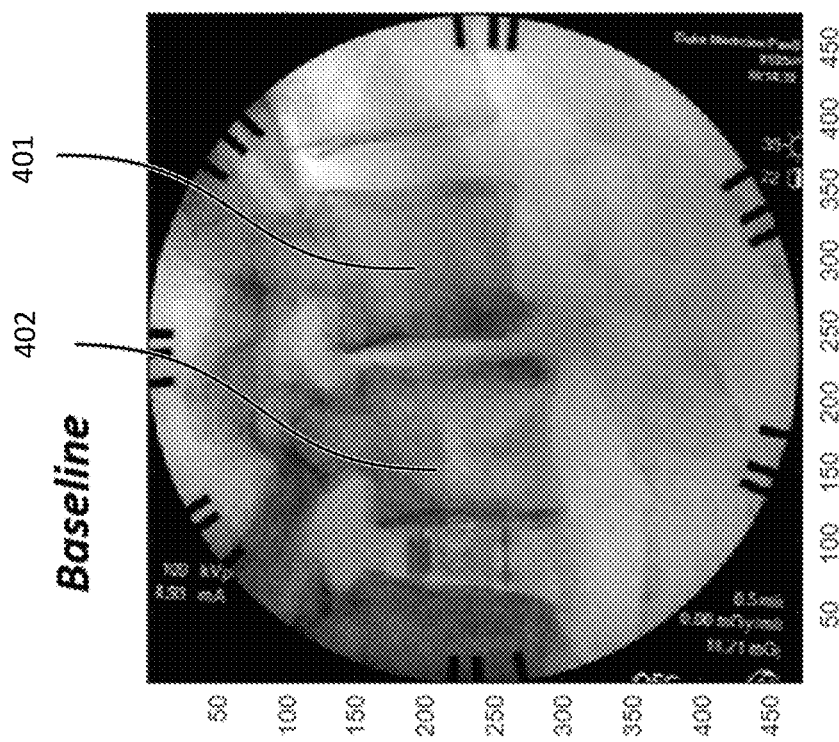
Figure 5:
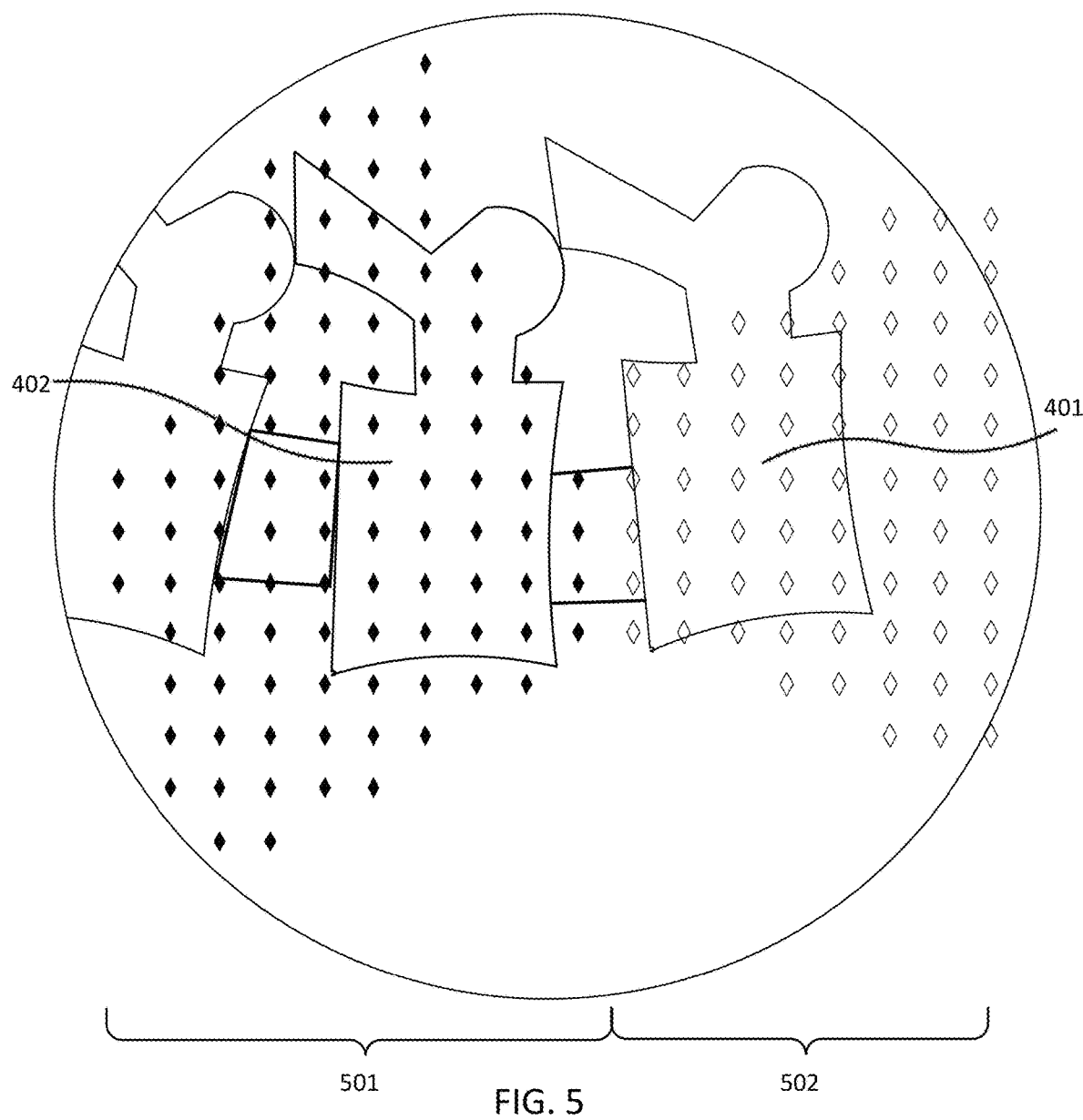
FIG. 5 shows an exemplary overlay image superimposed with possible user inputs for registering different vertebral bodies with the baseline image.

FIGS. 4A and 4B show another example of a baseline image (FIG. 4A) and an overlay image (FIG. 4B) which includes an expanded distance between two vertebrae 401, 402 due to implant insertion. FIG. 5 shows non-limiting exemplary selection dots 501, 502 that may yield optimal image registration for the vertebrae in FIGS. 4A and 4B. In this example, one or more user inputs on the left portion of the image can be used for image registration of vertebra 401 while one or more user inputs on a smaller region of the right portion of the image can be used for image registration of vertebra 402. There may or may not be one or more regions or pixels when selected by the user that cannot yield optimal registration of any objects (e.g., vertebral bodies).

Down-Weighting Functions

In some embodiments, the systems and methods herein include a weighting function to be applied to one or more medical images disclosed herein. The weighting function can be applied to one or more pixels or other regions in the overlay image, the baseline image, or both, thereby generating a weighted overlay image, a weighted baseline image, or both. In some embodiments, the weighting function is applied to the pixel intensity of the one or more pixels.

For instances, applying the weighting function to the pixel intensity of the one or more pixels can be based on the user input. The weighting function can be applied to dampen the pixel intensity based on a distance from the one or more pixels to the location of interest (e.g. the location of interest selected by the user). In some embodiments, when the distance is below a user-defined threshold, no dampening is applied. As a non-limiting example, the user-defined threshold for the distance is large enough to encompass at least a portion of the one or more objects. As another non-limiting example, the user-defined threshold is large enough to encompass at least a portion of the one or more objects.

In some cases, a preselected down-weighting function may be used for applying the weight to the pixel intensity of the one or more pixels. For example, a preselected down-weighting function is a circularly-symmetric function with a peak of 1 (e.g., no down-weighting) at the location of interest that drops continuously away from the peak. As another example, the preselected down-weighting function comprises a polynomial or sigmoid function that gradually asymptotes to zero at a distance of infinity from the location of interest. The rate of the drop off can be predetermined or selectable by the user.

In some embodiments, multiple down-weighting functions may be provided to the user for the selection of a down-weighting function. In some embodiments, the down-weighting function may be selected using an automated algorithm (e.g., a machine learning algorithm).

In some embodiments, the down-weighting function is a continuous and smooth function that provides zero or little down-weighting at and/or near the location of interest, and gradually increases the down-weighting as the distance to the location of interest increases. In some embodiments, the down-weighting function is non-linear.

In some embodiments, the location of interest (e.g., determined using user input) in the image serves as a "focus" for the subsequent image-registration algorithm. The image-registration algorithm can examine many candidate alignment transforms of the overlay and the baseline image (e.g., shift in left/right, shift in up/down, zoom in/out, and in-plane rotation), and compute a score for each transform that correlates with the similarity of image content between the two images after applying that transform. A higher score may indicate a better alignment or registration of the two images. The transform with the highest overall score can be chosen as the final estimated transform. The score can be a function of the pixel intensities of the image content (e.g., the grayscale values of the pixels) across all pixels in the overlap area of the two images.

The influence of different areas of the image in image alignment or registration can be altered in a controlled fashion by damping down the pixel intensity in that image. In some embodiments, the influence of locations that are not of interest or locations that are relatively far from the location of interest can be damped down. For example, the pixel intensity is down-weighted proportional to the distance from the center of the spot the user touched, such that the intensity remains unchanged in a small region centered at the touch, then gradually drops to zero by the edge of the image. The down-weighted image is then passed into the alignment score search algorithm. This may have the effect of dropping the score for transforms that primarily align image features very far from the touch location. Thus, the transforms that correspond to irrelevant anatomy have a lower chance of generating a high alignment score or winning the optimization. In some embodiments, the shape of the down-weighting function can be optimized for best alignment performance, such optimization can be based on empirical experience or determined automatically using machine learning.

Transforms and Image Registration

The existing image enhancement techniques may perform and display an image registration between a high quality and a low quality image, (e.g., an X-ray image), which can be based on matching vertebral anatomy in both images. Such image registration may assume a rigid transform between the two images so that one image can only differ in translation, scale, and/or in-plane rotation compared to the other image. This assumption can be violated if vertebrae in the field of view move relative to each other, which is a common scenario for spine surgery (e.g. disc space restored using an implant).

In some embodiments, the systems and methods herein estimate a rigid transform for the selected portion of the image (e.g., a baseline image or a high quality image). The rigid transform can include one or more of: in-plane translation, in-plane scaling, and in-plane rotation. The rigid transform can be two-dimensional.

In some embodiments, the systems and methods herein estimate a number of rigid transforms for the selected portion of the image, and for each estimated transform, a score that correlates to the goodness of registration between the portion and the other image (e.g., the baseline image) can be calculated. The optimal transform can be the transform with the best score of registration of the scores that are calculated. In some embodiments, the score that correlates to the transform is based on pixel intensity of pixels in an overlap area of the baseline image and the overlay image.

In some embodiments, the systems and methods herein utilize the specific transforms in image enhancement. In some embodiments, the transform is applied to the selected portion in the overlay image and the transformed overlay image is combined with (e.g., superimposed on) the overlay image for image enhancement of the selected portion.

Medical Images

In some embodiments, the medical images disclosed herein can be acquired in one or more specific orientations relative to the patient. As an example, the medical image can be an AP view, a lateral view, or an axial view. The baseline image and the overlay image are acquired from the same or nearly the same geometrical perspective of the subject (e.g., both images can be of an AP view or a lateral view).

In embodiments, the medical image herein is 2D. In some embodiments, the medical image is a projection image so that information along a third dimension perpendicular to the 2D image plane is lumped into a single pixel with no differentiation of the third dimension. In some embodiments, the medical image can have various image parameters such as image size, resolution, contrast, signal to noise ratio, etc.

In some embodiments, the medical image of the subject is an X-ray image. In some embodiments, the medical image of the subject is acquired using a flat panel X-ray detector or an image intensifier detector. In some embodiments, the image of the subject is acquired using a C-arm.

In some embodiments, the medical images herein include at least one anatomical features or objects of interest. In some embodiments, the anatomical features of interest can be a part of a spine of the subject. The anatomical features or objects can be one or more vertebral bodies.

In some embodiments, the one or more objects in the medical images comprise anatomical features of the subject. In further embodiments, the one or more objects comprise one or more vertebral bodies of the subject.

In some embodiments, the location of interest is in one or more objects. In further cases, location of interest is within a vertebral body. In some embodiments, the location of interest includes at least one pixel. In some embodiments, the location of interest includes more than one image pixel.

As disclosed herein, the one or more objects in the medical images comprise objects that are external to the anatomical features. In some cases, the one or more objects comprise instruments and/or surgical tools. Such instruments and/or surgical tools are not limited to metal. They may contain any material that may be opaque or dense in a way that may obscure anatomical information. In some embodiments, when the imaging modality is radiography or X-ray related, the instruments and/or surgical tools can be radiodense. With other imaging modalities, the instruments and/or surgical tools may not contain any metal but may contain one or more types of other materials that obstruct the anatomical information.

In some embodiments, the metal objects herein are equivalent to opaque objects or dense objects with the specific imaging modality used. For example, the metal objects disclosed herein may comprise glass or plastic that is opaque when the imaging modality is ultrasound.

In some embodiments, the baseline and overlay images disclosed herein can be acquired using one or more different imaging modalities, such as X-ray, CT, MRI, ultrasound, SPECT, and PET, among others.

Method Steps

In some embodiments, disclosed herein is a method for automatic identification of anatomical features in C-arm shots. The methods disclosed herein may include one or more method steps or operations disclosed herein but not necessarily in the order that the steps or operations are disclosed herein.

Figure 6:
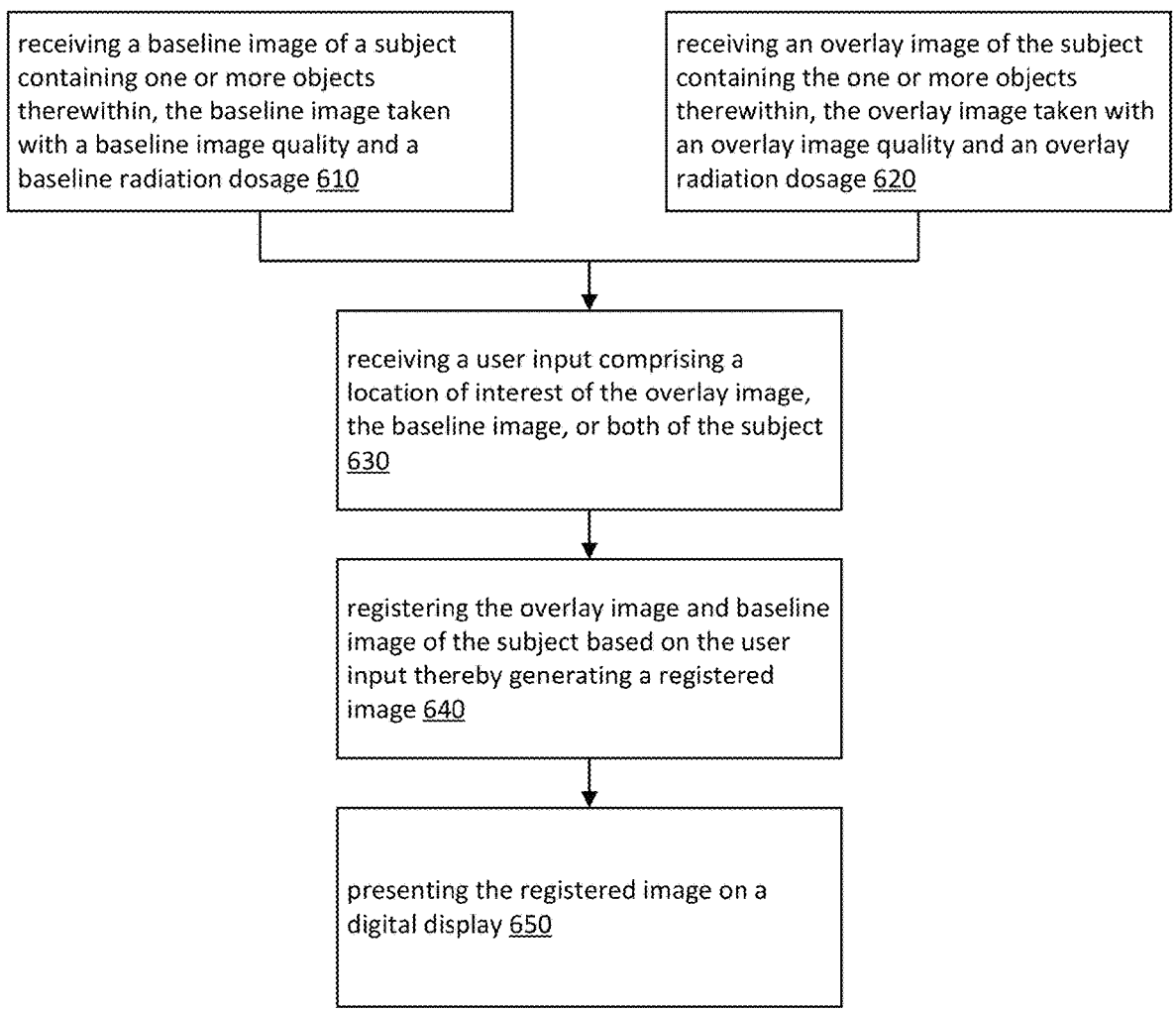
FIG. 6 shows a first non-limiting example of a method.

FIG. 6 shows a non-limiting exemplary embodiment 600 of the method steps for image registration of two medical images. The two medical images can be of similar anatomical features (e.g., a baseline image before operation and an overlay image after surgery. There can be changes or movements of anatomical features between the baseline and the overlay image.

In some embodiments, the methods disclosed herein include a step 610 of acquiring or receiving a baseline image of a subject containing one or more objects therewithin, the baseline image taken with a baseline image quality and a baseline radiation dosage. The objects can include anatomical features such as vertebral body or intervertebral discs.

The methods disclosed herein can include a step 620 of acquiring or receiving an overlay image of the subject containing the one or more objects therewithin, the overlay image taken with an overlay image quality and an overlay radiation dosage, wherein the overlay image quality is optionally lower than the baseline image quality.

In some embodiments, the methods herein include a step 630 of presenting the overlay image, the baseline image, or both to a user and receiving a user input comprising a location of interest of the overlay image, the baseline image, or both of the subject. In addition to the image(s), the user may be presented with prompts for instructions regarding providing user input of the location of interest. For example, the system can provide to the user a visual or vocal prompt to interact with a touch screen to indicate one or more vertebra on which he or she is most interested in performing the image registration.

In some embodiments, the methods disclosed herein include a step 640 of registering the overlay image and baseline image of the subject based on the user input thereby generating a registered image. The wherein registering the overlay image and baseline image of the subject based on the user input comprises one or more of: a) applying a weight to pixel intensity of one or more pixels in the overlay image, the baseline image, or both based on the user input, thereby generating a weighted overlay image, a weighted baseline image, or both; b) aligning the baseline image or the weighted baseline image relative to the weighted overlay image using a transformation; c) calculating a score that correlates to the transformation; d) repeating b) and c) until a stopping criterion is met; e) selecting an optimal transformation based on the score thereof; and f) applying the optimal transformation to register the overlay image and the baseline image.

In some embodiments, subsequent to the image registration, there is a step 650 of presenting the registered image to a user on a digital display. The registered image can be used for any of a variety of uses during the surgery. Example uses of registration are described in US 2017/0165008, which was previously incorporated herein by reference.

Second Method

Figure 7:
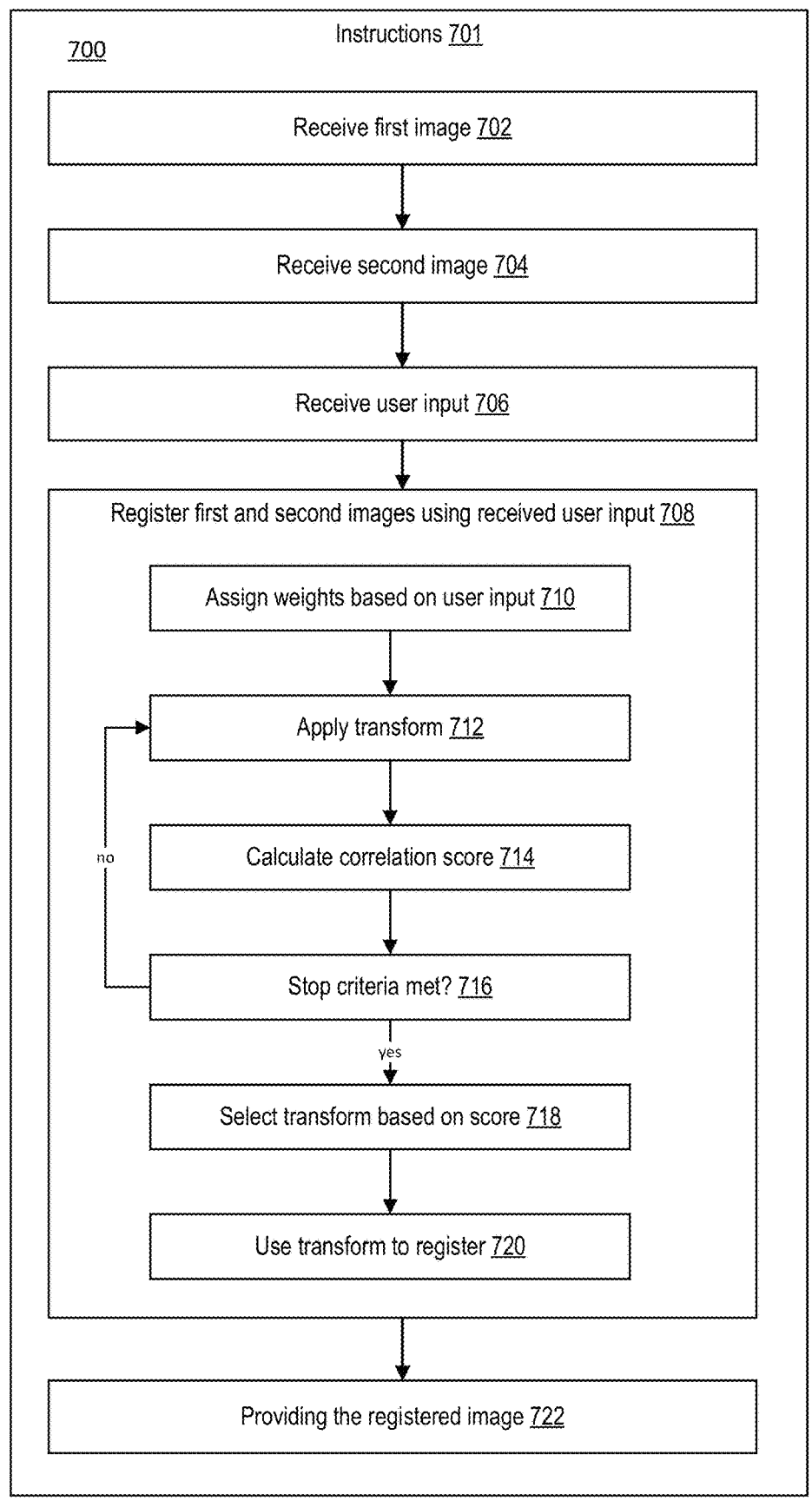
FIG. 7 illustrates a second non-limiting example of a method.

FIG. 7 illustrates an example method 700 for image registration of medical images. As illustrated, the method 700 can be implemented using one or more instructions 700. Method 700 includes operations 702-722.

Operation 702 includes receiving a first image. In an example, the operation 702 includes receiving a first image of a subject containing one or more objects therewithin. The first image can be taken with a first image quality and a first radiation dosage. The first image can be a pre-operative image.

Operation 704 includes receiving a second image. Operation 704 can include receiving a second image of the subject containing the one or more objects therewithin. The second image can be taken with a second image quality and a second radiation dosage. The second image quality is optionally lower than the quality of the first image. The second image can be an intraoperative image.

In an example, the first and second images are acquired from generally the same perspective of the subject (e.g., acquired from approximately a same angle and focused on approximately a same location). In an example, the first or second images can be two-dimensional or three-dimensional. The images can be X-ray images. The images can be acquired using a flat panel X-ray detector, using a C-arm, or using an image intensifier detector. The images can be an anterior-posterior view or a lateral view of a subject.

Operation 706 includes receiving user input. The user input can correspond to a location of interest of the one or more objects in the second image, the first image, or both the first and second images. In an example, one or more of the objects in one or both of the first and second images are anatomical features of the subject, such as one or more vertebrae of the subject. In an example, the location of interest is one or more objects, a vertebral body, or at least one pixel.

In some examples, the user input is a selection of one or more selection dots (e.g., selection dots 301, 302, 501, 502) or regions associated with such dots. In some examples, the operation 706 includes providing the first or second image to the user. The system can then receive one or more user inputs corresponding to one or more regions of the image. For example, the system 100 can prompt the user to select a first area of a first portion of an image and a second portion of a second portion of the image. Such portions can correspond to different vertebrae or other landmarks in the image. Responsive to receiving the one or more selections, the system 100 can preview the weighting that will result from the selection. In some examples, this preview can include displaying the resulting weighting to a user. If the displayed result is acceptable to the user (e.g., as indicated by detecting user selection of a confirmation button). In some examples, the user input is a drawing (e.g., a movement path) corresponding to one or more user-drawn contiguous regions within the image. In some examples, the user input corresponds to regions to be used for registration. In other examples, the user input corresponds to one or more regions not to be used for registration.

In some examples, the operation 706 includes displaying a pattern of shapes (e.g., polygonal shapes, such as triangles, squares, rectangles, pentagons, or hexagons). The system 100 receives a user selection of one or more of the shapes. The selected shapes can be used as the basis for the registration. For example, the regions enclosed by the selected shapes can be given full weighting for use in the registration, with the non-selected shapes being given little or no weight.

Operation 708 includes registering the second image and first image using the user input, thereby generating a registered image. An example registration technique is described in US 2016/0117823 (filed 2014 Dec. 9), which is hereby incorporated herein by reference in its entirety for any and all purposes. The operation 708 can include operations 710-720.

Operation 710 can include assigning weights based on user input. For example, the operation 710 can include applying a weight to pixel intensity of one or more pixels in the second image, the first image, or both based on the user input. Such an operation can thereby generate a weighted second image, a weighted first image, or both. In an example, applying the weight to the pixel intensity of the one or more pixels in the second image, the first image, or both based on the user input comprises applying the weight to the pixel intensity of the one or more pixels in the first image or only in the first image. In an example, applying the weight includes damping the pixel intensity based on a distance from the one or more pixels to the location of interest. Where the distance is below a pre-defined threshold (e.g., provided by the user), no damping is applied. The pre-defined threshold can be selected to be large enough to encompass at least a portion of the one or more objects. The applying of the weight can use a preselected down-weighting function, such as a circularly-symmetric function with a peak (e.g., value of 1) at the location of interest that drops continuously away from the peak. Further example functions include a polynomial or sigmoid function that asymptotes to zero at a distance of infinity from the location of interest.

Operation 712 can include applying a transformation. For example, the operation 712 can include aligning the first image or the weighted first image relative to the weighted second image using a transformation. Example transformations include shifting one or both images left, right, up, or down. Transformations can include zooming one or both images in or out. Transformations can include applying in-plane rotation to one or both of the images. The transformations can include a two-dimensional rigid transformation, the two-dimensional rigid transformation comprising one or more of: scaling, rotation, and translation.

Operation 714 can include calculating a score, such as a score that correlates to the transformation. In an example, the calculation is configured to be based on pixel intensity of pixels in an overlap area of the first image and the second image as modified by the weighting. In an example, the score is based on determining a difference between the two images using an image diff function, such as by subtracting pixel intensities of corresponding locations in the images.

Operation 716 includes determining whether a stop criterion is met. If so, the flow of the operation 708 moves to operation 718, else the flow returns to operation 712. I Operation 718 includes selecting a transform based on the score.

Operation 720 includes using the selected transform to register the images, such as by applying the optimal transformation to register the second image and the first image Operation 722 includes providing the registered image, such as optionally presenting the registered image on a digital display.

User Interfaces

The above-described techniques can be implemented using any of a variety of different kinds of user interfaces, including those described in FIGS. 8-11.

Figure 8:
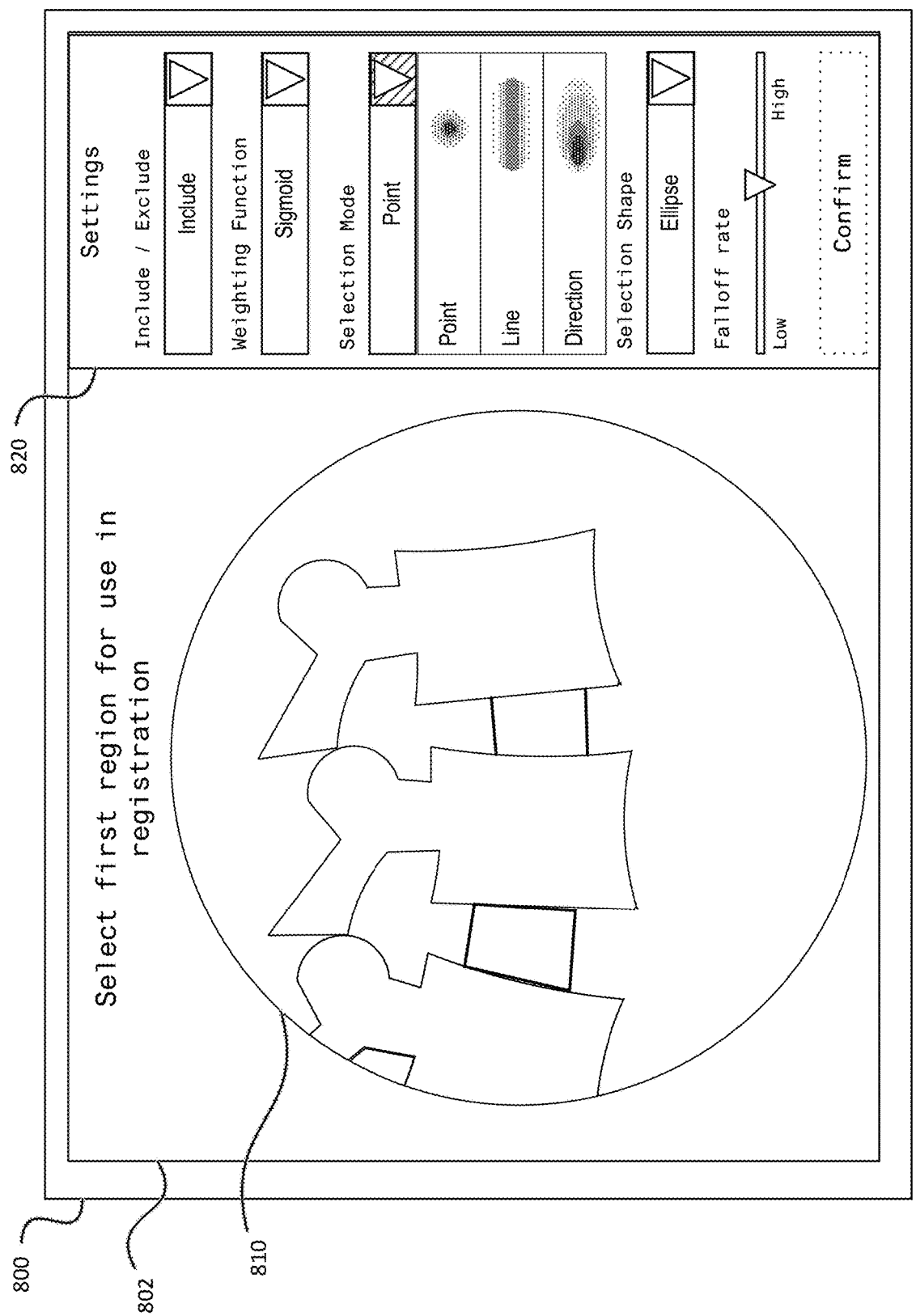
FIG. 8 illustrates a display showing a user interface that includes an image and settings pane.

FIG. 8 illustrates a display 800 showing a user interface 802 (e.g., produced, in part, by executing at least some of the instructions 701) that includes an image 810 and settings 820 pane. The user interface 802 prompts the user to select a first region of one more regions within the image 810 for use in registration. The user interface 802 can receive input from the user using any of a variety of different techniques.

The settings 820 include user interface elements for changing one or more registration parameters. An include/exclude element is configured to receive user input specifying whether the selection in the image 810 is to be included or excluded from use in registration. The setting can be used to determine whether to up weight (e.g., "include") the selection or down weight (e.g., "exclude") the selection. A weighting function is configured to receive user input specifying which one or more weighting function is to be used during the registration process. Example weighting functions include sigmoid or polynomial functions.

As illustrated, the drop down menu for the selection mode element is activated. The menu is configured to receive user input specifying how user input from the user is treated. Example selections include point selection (e.g., the user input is treated as a single point), line selection (e.g., the user input is treated as a line), directional selection (e.g., the user input is treated as a directional arrow), or freeform selection. Example results are shown by the corresponding selection mode.

A selection shape element is configured to receive user input specifying the shape of the selection. Example selections includes ellipse and polygonal (e.g., triangles, rectangles, pentagons, hexagons, etc.). A falloff rate element is configured to receive user input specifying how quickly the falloff from the selection occurs.

Figure 9:
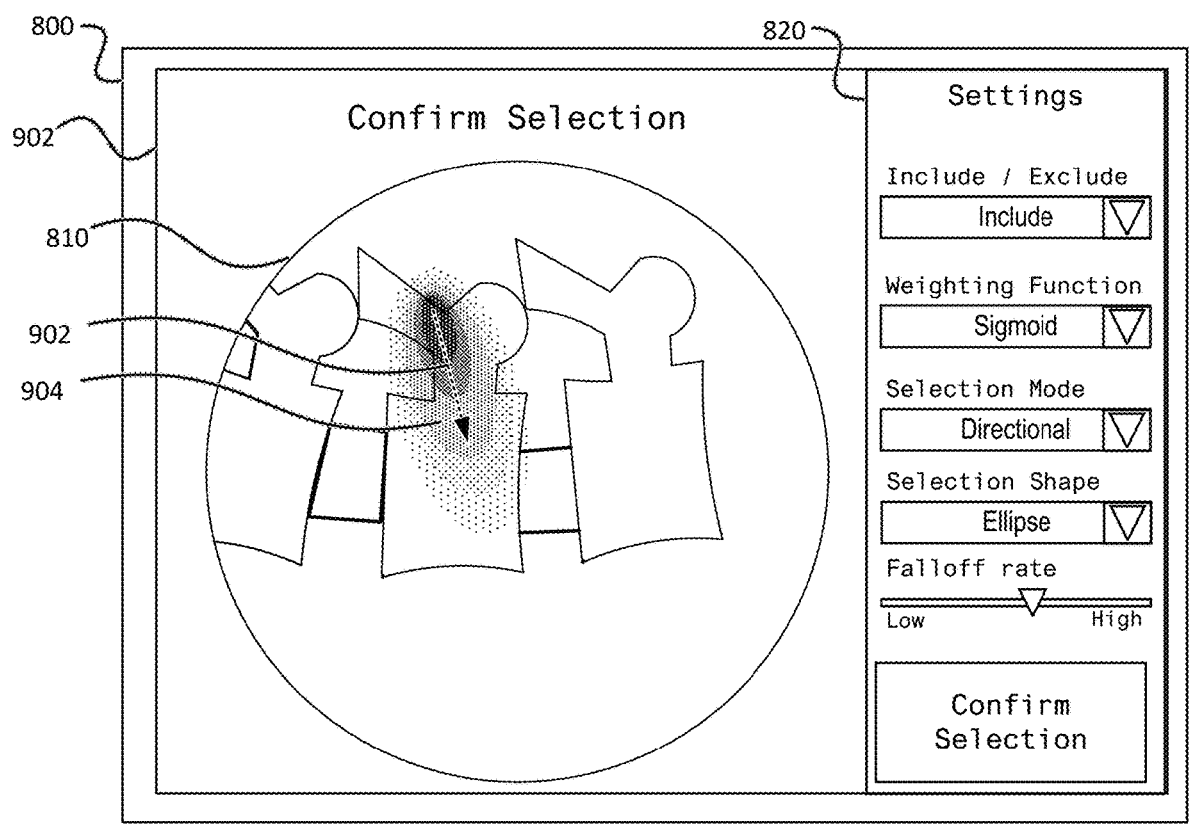
FIG. 9 illustrates a display showing a user interface after receiving a user input according to settings.

FIG. 9 illustrates the display 800 showing a user interface 902 after receiving a user input (e.g., a touch and drag or click and drag motion) according to settings corresponding to include, sigmoid, directional, and ellipse. The user interface 902 shows a representation of the user input in the form of an arrow disposed on the image 810. An indication 902 of the effect of the selection is also shown in the form of an elliptically shaped shaded area transitioning from opaque to transparent indicating the falloff of the weighting resulting from the user selection. The user interface 902 prompts the user to confirm the selection via a confirm-selection button. Subsequent input on the image 810 can modify the current selection.

Figure 10:
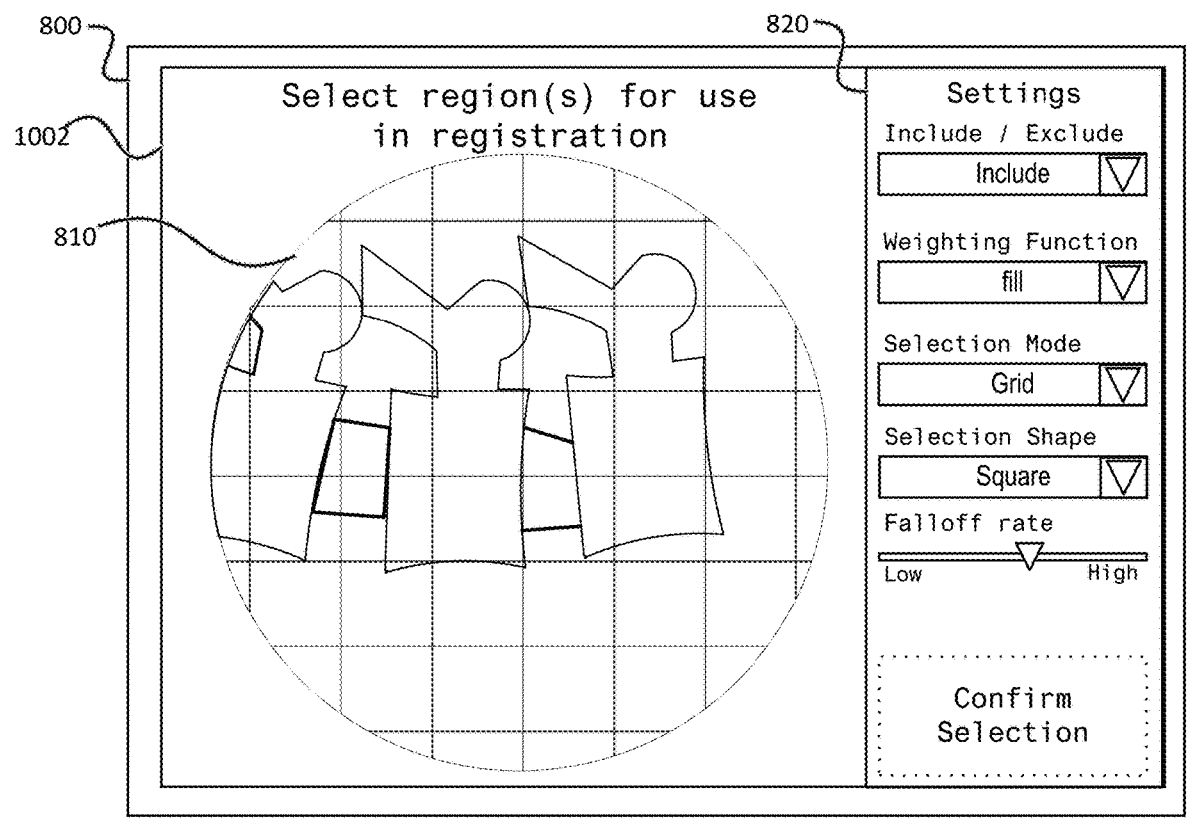
FIG. 10 illustrates a display showing a user interface providing a grid over an image for receiving one or more user selections corresponding to one or more regions to include in weighting.

FIG. 10 illustrates the display 800 showing a user interface 1002 providing a grid over the image 810 for receiving one or more user selections corresponding to one or more regions to include in the weighting. In some examples, the non-selected regions are excluded or given a lower weight.

Figure 11:
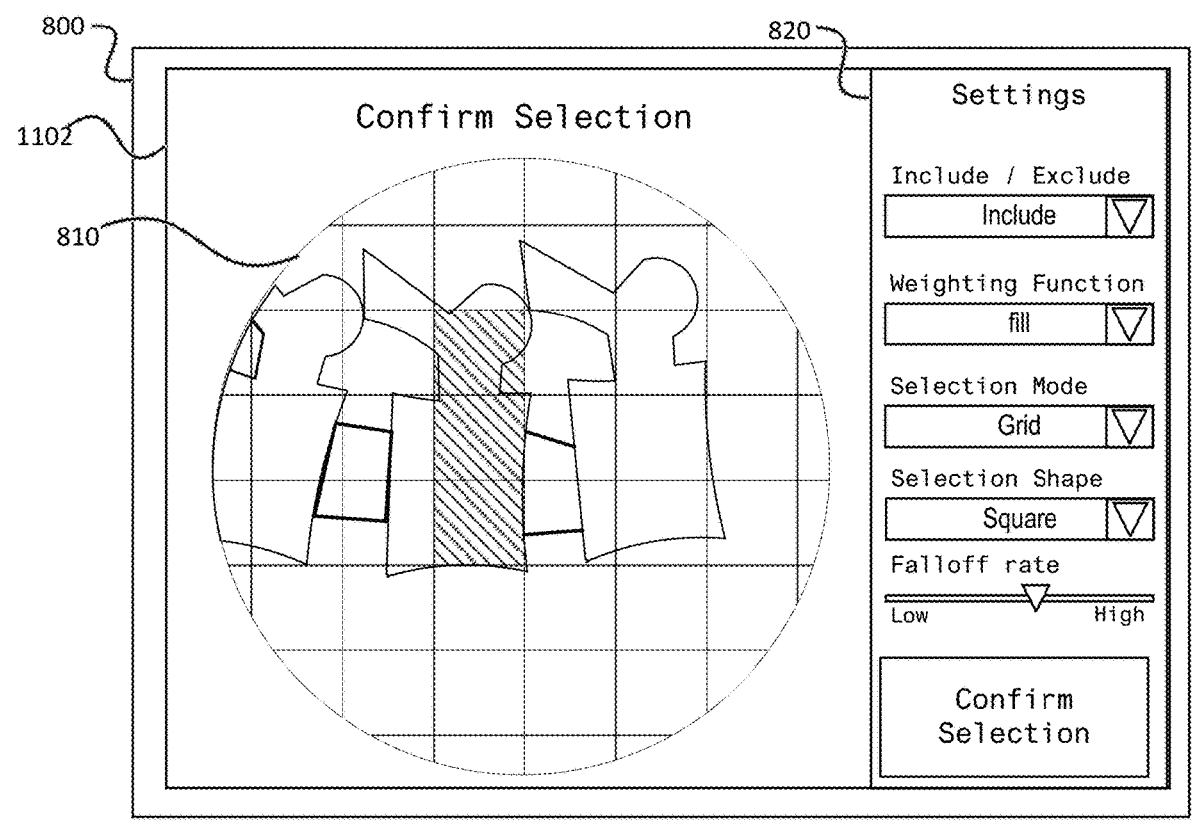
FIG. 11 illustrates a display showing a user interface providing a grid over an image having received a selection of three squares corresponding to one or more regions to include in weighting.

FIG. 11 illustrates the display 800 showing a user interface 1102 providing a grid over the image 810 having received a selection of three squares corresponding to one or more regions to include in the weighting. In the illustrated example, the weighting function is set to "fill" indicating that the area within the selection is given a consistent weight and that no falloff outside of the selected grid occurs.

Digital Processing Device

In some embodiments, the systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet (e.g., such that the device can access the World Wide Web). In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, medical workstations, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications.

In some embodiments, the digital processing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tape drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR (Virtual Reality) headset or AR (Augmented Reality) headset.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a gesture-based input device, such as KINECT by MICROSOFT, LEAP MOTION CONTROLLER by ULTRALEAP, or the like. In still further embodiments, the input device is a combination of devices such as those disclosed herein.

Figure 12:
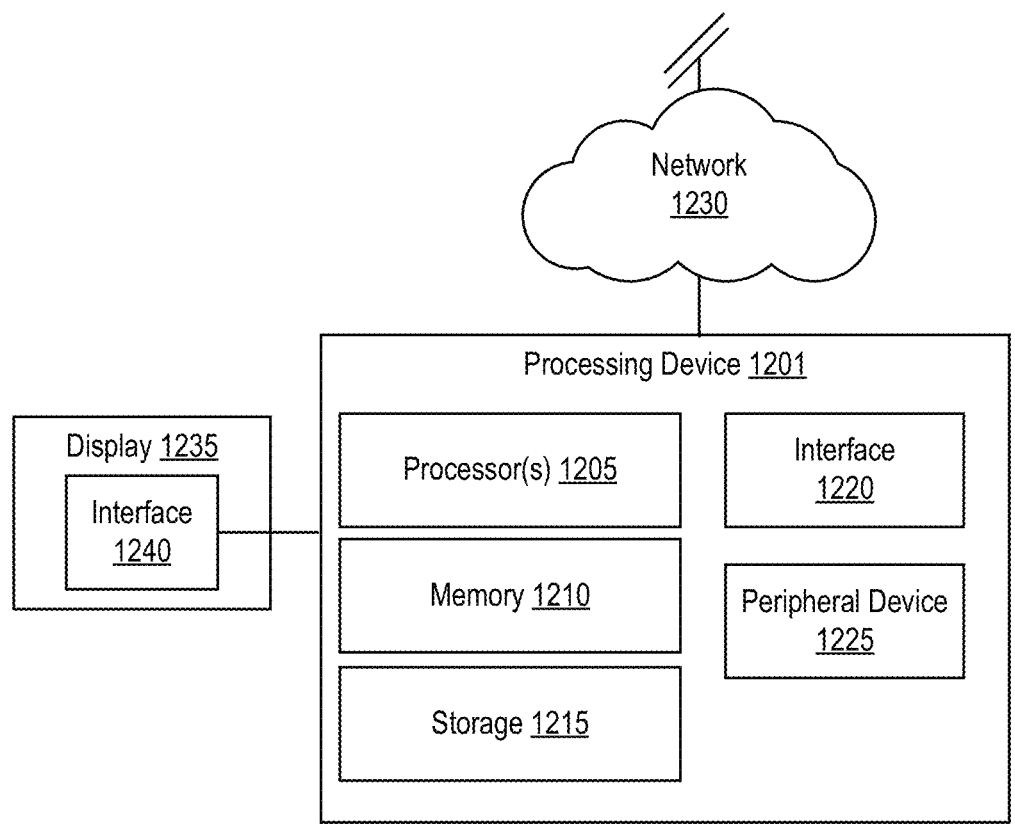
FIG. 12 shows a non-limiting example of the digital processing device as disclosed herein, in accordance with embodiments herein.

Referring to FIG. 12, in a particular embodiment, an exemplary processing device 1201 is programmed or otherwise configured to estimate visual acuity of a subject. The device 1201 can regulate various aspects of the algorithms and the method steps of the present disclosure. In this embodiment, the digital processing device 1201 includes a one or more processors 1205. The processors 1205 can include one or more central processing units, which can be a single core or multi core processor, or a plurality of processors for parallel processing. The processing device 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus, such as a motherboard. The storage unit 1215 can be a data storage unit (or data repository) for storing data. The processing device 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the device 1201, can implement a peer-to-peer network, which may enable devices coupled to the device 1201 to behave as a client or a server.

Continuing to refer to FIG. 12, the CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and write back. The CPU 1205 can be part of a circuit, such as an integrated circuit. One or more other components of the device 1201 can be included in the circuit. In some embodiments, the circuit is an application specific integrated circuit (ASIC) or a field programmable gate array (FPGA).

Continuing to refer to FIG. 12, the storage unit 1215 can store files, such as drivers, libraries and saved programs. The storage unit 1215 can store user data, e.g., user preferences and user programs. The digital processing device 1201 in some cases can include one or more additional data storage units that are external, such as located on a remote server that is in communication through an intranet or the Internet.

Continuing to refer to FIG. 12, the digital processing device 1201 can communicate with one or more remote computer systems through the network 1230. For instance, the device 1201 can communicate with a remote computer system of a user. Examples of remote computer systems include personal computers (e.g., a portable computer), slate or tablet computers (e.g., APPLE IPAD, SAMSUNG GALAXY TAB), telephones, smart phones (e.g., APPLE IPHONE, ANDROID-enabled device, BLACKBERRY device), personal digital assistants, augmented reality devices, or virtual reality devices.

Methods or method steps as described herein can be implemented by way of machine (e.g., computer processor) executable code stored on an electronic storage location of the digital processing device 1201, such as, for example, on the memory 1210 or electronic storage unit 1215. The machine executable or machine readable code can be provided in the form of software. During use, the code can be executed by the processor 1205. In some embodiments, the code can be retrieved from the storage unit 1215 and stored on the memory 1210 for ready access by the processor 1205. In some situations, the electronic storage unit 1215 can be precluded, and machine-executable instructions are stored on memory 1210.

The digital processing device 1201 can include or be in communication with an electronic display 1235 that comprises a user interface (UI) 1240 for providing, for example, means to accept user input from an application at an application interface. Examples of UIs include, without limitation, a graphical user interface (GUI).

Non-Transitory Computer Readable Storage Medium

In some embodiments, the systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some embodiments, the program and instructions are permanently, substantially permanently, semi-permanently, or non-transitorily encoded on the media.

Computer Program

In some embodiments, the systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as MICROSOFT.NET or RUBY ON RAILS. In some embodiments, a web application utilizes one or more database systems including, by way of non-limiting examples, relational, non-relational, object oriented, associative, and XML database systems. In further embodiments, suitable relational database systems include, by way of non-limiting examples, MICROSOFT SQL SERVER, MYSQL, and database products by ORACLE. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JAVASCRIPT and XML (AJAX), FLASH, ACTIONSCRIPT, JAVASCRIPT, or SILVERLIGHT. In some embodiments, a web application is written to some extent in a server-side coding language such as Active Server Pages (ASP), COLDFUSION, PERL, JAVA, JAVASERVER PAGES (JSP), Hypertext Preprocessor (PHP), PYTHON, RUBY, Tcl, SMALLTALK, WEBDNA, or GROOVY. In some embodiments, a web application is written to some extent in a database query language such as Structured Query Language (SQL). In some embodiments, a web application integrates enterprise server products such as HCL DOMINO or MICROSOFT AZURE. In some embodiments, a web application includes a media player element. In various further embodiments, a media player element utilizes one or more of many suitable multimedia technologies including, by way of non-limiting examples, ADOBE FLASH, HTML 5, APPLE QUICKTIME, MICROSOFT SILVERLIGHT, JAVA, and UNITY.

Software Modules

In some embodiments, the systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, media, and methods disclosed herein include one or more databases, or use of the same. In view of the disclosure provided herein, those of skill in the art will recognize that many databases are suitable for storage and retrieval of preliminary information of a subject, chart data of a subject, input and/or output of models herein etc. In various embodiments, suitable databases include, by way of non-limiting examples, relational databases, non-relational databases, object oriented databases, object databases, entity-relationship model databases, associative databases, and XML databases. Further non-limiting examples include SQL, POSTGRESQL, MYSQL, ORACLE, DB2, and NOSQL databases. In some embodiments, a database is Internet-based. In further embodiments, a database is web-based. In still further embodiments, a database is cloud-computing-based. In other embodiments, a database is based on one or more local computer storage devices.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method disclosed herein, the operations may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the systems, and/or devices described herein may be embodied as integrated components or as separate components.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

What is claimed is:

1. A method for image registration of medical images, the method comprising: receiving a first image of a subject containing one or more objects there within, the first image taken
with a first radiation dosage;
receiving a second image of the subject containing the one or more objects there within, the second image taken with a second radiation dosage, wherein the second radiation dosage is lower than the first radiation dosage;
receiving a user input from an input device comprising a selection of a location of interest of the one or more objects in the second image, the first image, or both the second image and the first image;
in response to the user input received from the input device, providing an indication of an effect of the selection of the location of interest in the second image, the first image, or both the second image and the first image;
registering the second image and first image of the subject based on the user input thereby generating a registered image, including to score each of a plurality of candidate alignment transforms of the second image and the first image based on the selection of the location of interest in the second image, the first image, or both the second image and the first image;
applying a weight to pixel intensity of one or more pixels in the second image, the first image, or both the second image and the first image, based on the user input, thereby generating a weighted second image, a weighted first image, or both the weighted second image and the weighted first image;
weighing the pixel intensity proportionally to the distance from the center of the spot the user selected, such that the intensity remains unchanged in a small region centered on the selected position, then gradually drops to zero by the edge of the image, the down weighted image is then passed into alignment score search algorithm, wherein the transforms that correspond to irrelevant anatomy are configured with a lower percentage of optimization; and
presenting the registered image on a digital display.

2. The method of claim 1, wherein registering the second image and first image of the subject based on the user input comprises:
    a) generating a weighted second image, a weighted first image, or both the weighted second image and the weighted first image;
    b) aligning the first image or the weighted first image relative to the weighted second image using a transformation;
    c) calculating a score that correlates to the transformation;
    d) repeating b) and c) until a stopping criterion is met;
    e) selecting an optimal transformation based on the score thereof; and
    f) applying the optimal transformation to register the second image and the first image.

3. The method of claim 2, wherein applying the weight to the pixel intensity of the one or more pixels in the second image, the first image, or both the second image and the first image, based on the user input comprises applying the weight to the pixel intensity of the one or more pixels in the first image or only in the first image.

4. The method of claim 2, wherein applying the weight to the pixel intensity of the one or more pixels in the second image, the first image, or both the second image and the first image, based on the user input comprises damping the pixel intensity based on a distance from the one or more pixels to the location of interest.

5. The method of claim 4, when the distance is below a user-defined threshold, no damping is applied.

6. The method of claim 4, wherein the user-defined threshold is large enough to encompass at least a portion of the one or more objects.

7. The method of claim 2, wherein applying the weight to the pixel intensity of the one or more pixels in the second image, the first image, or both the second image and the first image, based on the user input comprises using a preselected down-weighting function.

8. The method of claim 7, wherein the preselected down-weighting function is a circularly-symmetric function with a peak of 1 at the location of interest that drops continuously away from the peak.

9. The method of claim 7, wherein the preselected down-weighting function comprises a polynomial or sigmoid function that asymptotes to zero at a distance of infinity from the location of interest.

10. The method of claim 2, wherein aligning the first image or the weighted first image relative to the weighted second image using the transformation comprises a two-dimensional rigid transformation, the two-dimensional rigid transformation comprising one or more of: scaling, rotation, and translation.

11. The method of claim 2, wherein the score that correlates to the transformation is based on pixel intensity of pixels in an overlap area of the first image and the second image.

12. The method of claim 1, wherein the one or more objects comprises anatomical features of the subject.

13. The method of claim 1, wherein the one or more objects comprises one or more vertebrae of the subject.

14. The method of claim 1, wherein the first image and the second image are acquired from generally the same geometrical perspective of the subject.

15. The method of claim 14, wherein both of the first image and the second image are of an AP view or a lateral view of the subject.

16. The method of claim 1, wherein the user input is received from the input device selected from the group consisting of a mouse and a touch screen.

17. The method of claim 1,
wherein the location of interest is in one or more objects; wherein the location of interest is within a vertebral body; wherein the location of interest includes at least one pixel; wherein the first image or the second image is two-dimensional; wherein
the first image or the second image is an X-ray image;
wherein the first image or the second image is acquired using a flat panel X-ray detector or an image intensifier detector; or
wherein the first image or the second image is acquired using a C-arm.

18. The method of claim 1, wherein the indication of the effect of the selection of the location of interest comprises a shape of a weighting that will be applied based on the user input received from the input device.

19. The method of claim 1, wherein the indication of the effect of the selection of the location of interest comprises an elliptically shaped shaded area transitioning from opaque to transparent indicating a falloff of the weighting resulting from the user input received from the input device.

* * * * *